Jan. 29, 1924.
A. E. MASON
1,482,312
THRUST SCREW FOR FRICTION HOISTS
Filed March 21, 1922
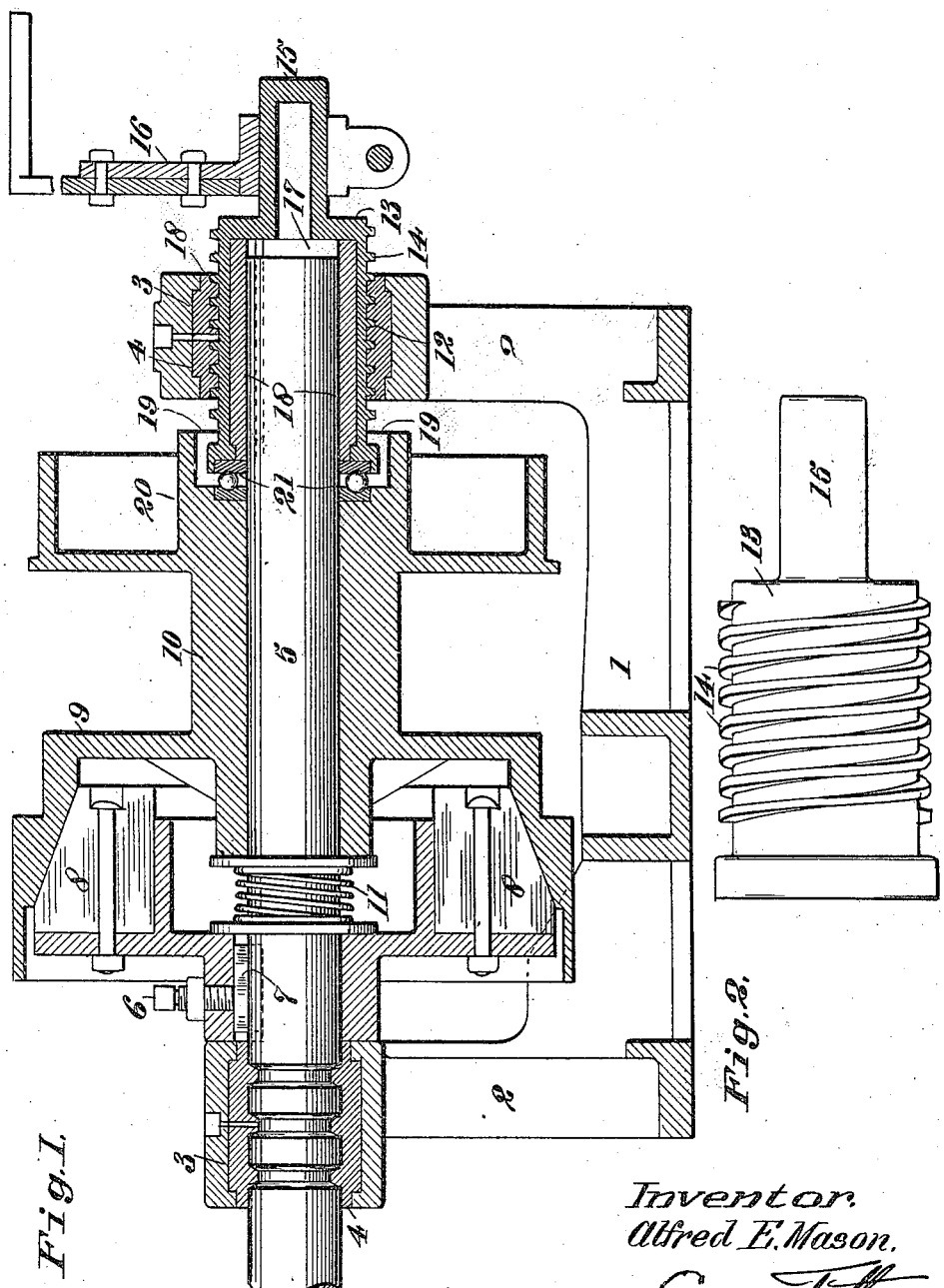
Inventor.
Alfred E. Mason.
By Ickes & Totter
Attorneys.

Patented Jan. 29, 1924.

1,482,312

UNITED STATES PATENT OFFICE.

ALFRED E. MASON, OF SAN FRANCISCO, CALIFORNIA.

THRUST SCREW FOR FRICTION HOISTS.

Application filed March 21, 1922. Serial No. 545,560.

*To all whom it may concern:*

Be it known that I, ALFRED E. MASON, a citizen of the United States, residing at the city and county of San Francisco and State of California, have invented certain new and useful Improvements in Thrust Screws for Friction Hoists, of which the following is a specification.

This invention relates to an improved operating device for throwing into engagement the clutch members of a friction hoist.

This invention has for its principal object to provide a clutch engaging installation in the form of a thrust screw for receiving the hoist shaft and affording a bearing therefor, at the same time enabling the movement of one member of the clutch on the shaft to afford and break the driving connection between the driving member of the clutch and the driven member of the clutch.

A further object is to provide a construction wherein a thrust screw has a threaded bearing mounting within a trunnion and affords on its interior a bearing in which the hoist shaft rotates.

With the above mentioned and other objects in view, the invention consists in the novel construction and combination of parts hereinafter described, illustrated in the accompanying drawings, and set forth in the claim hereto appended, it being understood that various changes in the form, proportion, size and minor details of construction within the scope of the claims may be resorted to without departing from the spirit or sacrificing any of the advantages of the invention.

To more fully comprehend the invention reference is directed to the accompanying drawings, wherein:—

Figure 1 is a longitudinal sectional view of a hoist illustrating one embodiment of my invention.

Figure 2 is a view in elevation of the thrust shell disclosing the thread on the peripheral surface thereof.

Referring more particularly to the several views of the drawings wherein like characters of reference designate corresponding parts, 1 is a bed from opposite ends of which extend upwardly the supports 2, each formed with a bearing opening 3, which openings are disposed in alignment. Each of the openings 3 carries a liner or bushing 4, and in one of said bushings rotates the shaft 5, to which is secured, as by a set screw 6 and key 7, the driving member 8 of a suitable friction clutch of any well known type.

Opposing said driving clutch member 8, and within which said driving clutch member is received, is an annular driven clutch member 9 mounting a drum 10 and which is rotatable on the shaft 5, and said driven clutch member 9 and drum 10 are capable of longitudinal movement on the shaft 5 and are normally disengaged from the driving clutch member 8 by the action of a clutch throw-out spring 11 positioned between adjacent ends of the hubs of the respective clutch members. The bushing 4 of the other bearing opening 3 is provided with an internal thread 12, and within the same is positioned a tubular shell 13, formed on its surface with a thread 14 for reception within the thread 12 in the bushing 4. Outwardly from one end of the shell 13 extends a stem 15, to which is secured a crank or lever 16, which permits rotative movement to be imparted to the shell 13 to move the same through its threaded connection 12 and 14 longitudinally within said bushing 4. The tubular opening 17 within said shell 13 is disposed in line with and receives one end of the shaft 5, said opening being lined with a bushing 18 within which the end of said shaft 5 rotates. The inner end of said shell 13 is received within an annular pocket 19 formed in one end of the hub 20 of the drum 10, and between the inner end of the shell 13 and the end wall of said pocket is positioned a thrust bearing 21 of any desired construction.

It will be observed that on movement being imparted to the lever 16, the shell 13 will be adjusted inwardly or outwardly in the bushing 4, causing the engagement or disengagement of the clutch members. When the shell is moved outwardly the spring 11 separates the engaging faces of the clutch members. In this construction it will be apparent that the shaft 5 rotates within the bushing in shell 13, and that said shell in turn is mounted in a bushing 4 and is capable of adjustment therein longitudinally of the shaft 5.

I claim:—

In combination, a movable clutch part, a rotatable supporting shaft therefor on which said movable clutch part rotates and is longitudinally movable, a fixed bearing for one end of said shaft, a co-operating clutch part rotatable with and held from longitudinal movement on said shaft, a bearing box formed with an internal screw threaded bore arranged co-axially of the shaft, a cylindrical tubular shell open at one end and closed at its opposite end, forming a thrust member within said threaded bore and providing a bearing recess into which through its open end said shaft is received, said thrust member having a smooth interior and a threaded outer surface for co-operating with the threaded bore of the bearing box, a thrust bearing between the end of the thrust member and said movable clutch part, a lever associated with the closed end of the tubular thrust member for imparting rotation thereto to advance said thrust member longitudinally in said bearing box to force said clutch parts into engagement, and a spring between said clutch parts and surrounding said shaft for disengaging said clutch parts on the retraction of said screw.

In testimony whereof I have signed my name to this specification.

ALFRED E. MASON.